United States Patent
Seames et al.

(10) Patent No.: US 7,618,603 B2
(45) Date of Patent: Nov. 17, 2009

(54) MERCURY OXIDATION OF FLUE GAS USING CATALYTIC BARRIER FILTERS

(75) Inventors: Wayne Seames, Grand Forks, ND (US); Michael D. Mann, Thompson, ND (US); Darrin S. Muggli, Grand Forks, ND (US)

(73) Assignee: The University of North Dakota, Grand Forks, ND (US)

( * ) Notice: Subject to any disclaimer, the term of this patent is extended or adjusted under 35 U.S.C. 154(b) by 406 days.

(21) Appl. No.: 11/328,726

(22) Filed: Jan. 10, 2006

(65) Prior Publication Data

US 2006/0159605 A1 Jul. 20, 2006

Related U.S. Application Data

(60) Provisional application No. 60/642,678, filed on Jan. 10, 2005.

(51) Int. Cl.
*B01D 53/64* (2006.01)
(52) U.S. Cl. .................. 423/210; 423/99; 423/594.18
(58) Field of Classification Search ............... 423/99, 423/210, 594.18
See application file for complete search history.

(56) References Cited

U.S. PATENT DOCUMENTS

| | | | |
|---|---|---|---|
| 4,210,774 A | 7/1980 | Perry | |
| 4,250,363 A | 2/1981 | Heberlein et al. | |
| 4,257,922 A | 3/1981 | Kim et al. | |
| 4,294,685 A | 10/1981 | Kim et al. | |
| 4,330,370 A | 5/1982 | Kazan et al. | |
| 4,686,192 A | 8/1987 | Fisher | |
| 4,705,573 A | 11/1987 | Wood et al. | |
| 4,766,549 A | 8/1988 | Schweitzer, III et al. | |
| 4,873,056 A | 10/1989 | Fisher | |
| 4,957,871 A | 9/1990 | Fisher | |
| 4,993,503 A | 2/1991 | Fischer et al. | |
| 5,006,786 A | 4/1991 | McKubre et al. | |
| 5,038,676 A | 8/1991 | Davis et al. | |
| 5,141,760 A | 8/1992 | Davis et al. | |
| 5,172,644 A | 12/1992 | Offen | |
| 5,200,149 A | 4/1993 | Fisher | |
| 5,200,521 A | 4/1993 | Illian et al. | |
| 5,281,826 A | 1/1994 | Ivancic et al. | |
| 5,415,850 A | 5/1995 | Yang et al. | |
| 5,426,350 A | 6/1995 | Lai | |
| 5,449,046 A | 9/1995 | Kinnan | |
| 5,505,766 A | 4/1996 | Chang | |
| 5,575,982 A * | 11/1996 | Reiss et al. | .................. 423/210 |
| 5,620,669 A | 4/1997 | Plinke et al. | |

(Continued)

OTHER PUBLICATIONS

The English abstract of DE 36 34 360 A published on Mar. 10, 1988.*

(Continued)

*Primary Examiner*—Timothy C Vanoy
(74) *Attorney, Agent, or Firm*—Kinney & Lange, P.A.

(57) ABSTRACT

A method for oxidizing elemental mercury contained in flue gas uses a catalytic barrier filter. The method comprises directing the flue gas towards the catalytic barrier filter; passing the flue gas through the catalytic barrier filter in the presence of an oxidant; and outletting the flue gas from the catalytic barrier filter, wherein about 50 percent to about 99 percent of the elemental mercury is oxidized.

18 Claims, 2 Drawing Sheets

U.S. PATENT DOCUMENTS

| | | | |
|---|---|---|---|
| 5,827,352 | A | 10/1998 | Altman et al. |
| 5,854,173 | A | 12/1998 | Chang et al. |
| 5,948,143 | A | 9/1999 | Sjostrom et al. |
| 5,965,095 | A | 10/1999 | Owens et al. |
| 6,136,072 | A | 10/2000 | Sjostrom et al. |
| 6,214,189 | B1 | 4/2001 | Won et al. |
| 6,267,940 | B1 | 7/2001 | Chang et al. |
| 6,331,351 | B1 | 12/2001 | Waters et al. |
| 6,468,489 | B1 | 10/2002 | Chang et al. |
| 6,488,740 | B1 | 12/2002 | Patel et al. |
| 6,558,454 | B1 | 5/2003 | Chang et al. |
| 6,695,894 | B2 | 2/2004 | Chang et al. |
| 6,712,878 | B2 | 3/2004 | Chang et al. |
| 7,141,091 | B2 | 11/2006 | Chang |
| 7,306,774 | B2 * | 12/2007 | DeBerry .................. 423/210 |
| 2003/0175194 | A1 | 9/2003 | Pahlman et al. |
| 2004/0074391 | A1 | 4/2004 | Durante et al. |
| 2005/0148465 | A1 * | 7/2005 | Durante et al. .............. 502/401 |

OTHER PUBLICATIONS

James E. Staudt, Ph.D., et al., Optimizing Compliance Cost for Coal-Fired Electric Generating Facilities in a Multipollutant Control Environment, Proceedings ASME Power 2004, ASME Power Conference, Baltimore, Maryland, Mar. 30-Apr. 1, 2004, pp. 1-10.

Vincent A. Durante et al., "A Novel Technology to Immobilize Mercury from Flue Gases," Paper #232, pp. 1-20 (May 2003) W.L. Gore & Associates, Inc.

Search Report and Written Opinion of the International Searching Authority in counterpart International Application No. PCT/US 06/00721 filed Jan. 10, 2006.

* cited by examiner

MERCURY OXIDATION OF FLUE GAS USING CATALYTIC BARRIER FILTERS

This application claims priority from U.S. Provisional Application No. 60/642,678 filed Jan. 10, 2005 for MERCURY OXIDATION OF FLUE GAS USING CATALYTIC BARRIER FILTERS, which is incorporated by reference.

BACKGROUND OF THE INVENTION

Mercury is listed third on the Environmental Protection Agency (EPA) list of toxic substances. According to the Mercury Study Report to Congress, coal combustion is the primary source of emissions in the United States, accounting for 72 percent of the 158 tons per year of the total mercury emissions.

Mercury is released from flue gas emitted from various types of plant stacks, and can exist in the environment in the form of elemental mercury, inorganic mercury salts or oxides, or organomercury compounds. Mercury in the air can then deposit in soil or water. The lifetime of elemental mercury in the atmosphere is a significant problem because it can reside in there for a period up to one year.

Because of the significant adverse effects of mercury accumulation in the ecosystem, stricter regulations regarding mercury emissions have been put in place. The regulation of hazardous air pollutants, including mercury, was significantly revised by Congress in the 1990 Clean Air Act. In December of 2000, the EPA announced that it will regulate mercury emissions from coal-fired boilers. Further, in January of 2004, the EPA issued their proposed rules in the "National Emissions Standards for Hazardous Air Pollutants" (40 CFR Parts 60 and 63). Through this new program, the EPA plans to reduce mercury emissions by nearly 70% by 2018. To comply with a consent agreement, the EPA also proposed a modest Maximum Achievable Control Technology standard to reduce mercury emissions by 29% by the end of 2007.

The development of mercury control technologies has been ongoing for the last decade. The implementation of EPA regulated controls for coal-fired power plants is scheduled for December 2007, yet there is currently no single best technology that can be applied broadly yet still efficiently remove mercury from the flue gas stream.

Further, based on what is readily available to date, mercury control technologies will be very costly, with estimates for its removal as high as $0.004/kWH ($3-$7 billion/yr). The primary problem for mercury emission control is that existing methods are highly dependent upon its speciation, or the form that the mercury is in. Specifically, most oxidized mercury compounds, including mercury oxide and mercury chloride, are more condensable and water soluble than other forms of mercury and, therefore, can be effectively captured in conventional pollution control systems (e.g., wet scrubber and particulate control devices).

Unfortunately, a significant portion of mercury, ranging from 30% to 70%, leaving the boiler is in its elemental form and therefore cannot be easily or efficiently captured. Although the injection of sorbents into the gas stream can enhance the capture of oxidized mercury through wet scrubbers, the performance of sorbents for elemental mercury capture is very limited. Further, if high amounts of sorbents are used in packed-bed adsorption facilities, it is expected that the cost will be even higher, because of the poor adsorption of elemental mercury by sorbents.

Two of the biggest concerns with mercury removal to date are the addition of supplemental substances such as chlorine to promote oxidation that can cause corrosion problems; and preventing the catalyst surface from becoming coated with solid particles, because as the particulate matter begins to coat the surface of the catalyst, the active surface area of the catalyst is reduced and therefore eventually rendered ineffective.

Therefore, if mercury control targets are to be met yet still be cost effective, new methods must be developed to easily and effectively remove mercury from flue gases emitted by coal-fired power plants.

BRIEF SUMMARY OF THE INVENTION

The present invention relates to a process for the oxidation of elemental mercury in a gas stream using a barrier filter impregnated with a catalyst. The catalytic barrier filter is placed in a flue gas stream occurring from a combustion process using solid or liquid fuels containing elemental mercury. As the gas stream flows through the barrier filter, elemental mercury contained within the gas is oxidized by the catalyst as it flows through the filter. The catalyst will adhere to the barrier filter without the need for any special adhesion mechanism. The oxidant, such as oxygen or chlorine, is found naturally in the flue gas stream, and therefore does not need to be added. The process also facilitates the simultaneous removal of solid particles, such as ash, present in the gas stream by the catalytic barrier filter. After passing through the catalytic barrier filter, the flue gas stream is then passed through other devices or processes employed to remove oxidized mercury.

DETAILED DESCRIPTION OF INVENTION

Figure 1:
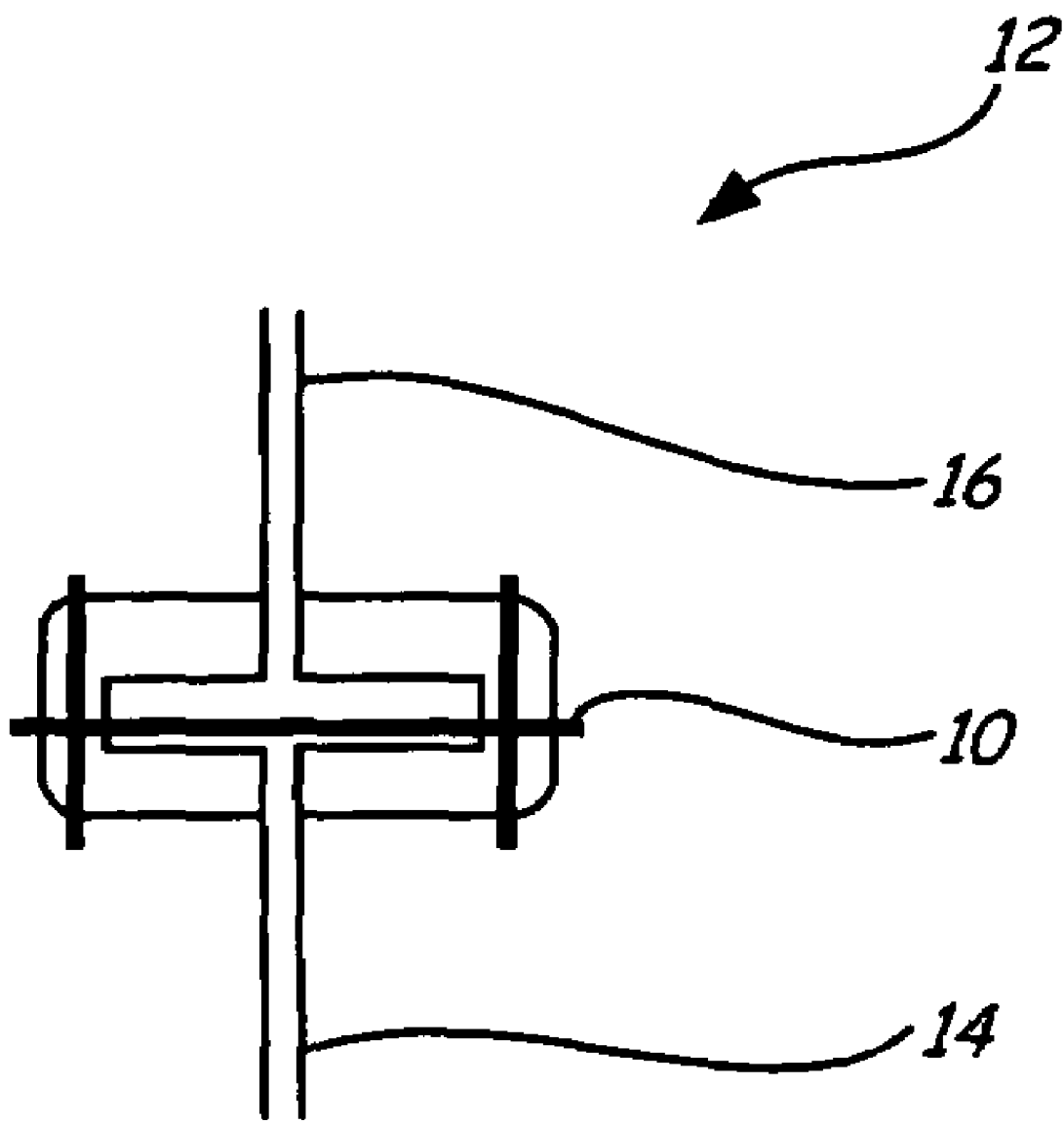
FIG. 1 is a schematic illustration of an enclosed catalytic barrier filter.

The present invention provides a method for easily and efficiently removing mercury present in a gas stream using a catalyst that is impregnated onto a barrier filter. The process involves the oxidation of elemental mercury using a catalytic barrier filter placed in line with the flue gas stream, which is generated during the combustion of mercury-containing solid fuels, for example coal. In one embodiment, a single catalytic barrier filter is used. In other embodiments, a plurality of catalytic barrier filters can be used. The oxidants do not need to be added because they are present in the flue gas. In other embodiments, additional oxidants, for example oxygen, chlorine, peroxides, HCl, hypoclorite, and combinations thereof, can be added to the flue gas stream to aid in oxidation. The catalytic barrier filter is also able to simultaneously remove particulate matter, for example ash, from the flue gas.

In one embodiment, the oxidation of elemental mercury in flue gas occurs through an enclosed catalytic barrier filter. Enclosed filters can include bag filters, baghouse filters, candle filters, and combinations thereof. In other embodiments, any type of filter, enclosed or open, can be used. These may include, for example, polymeric, metallic, ceramic, natural fiber filters, and combinations thereof.

The catalyst used on the barrier filter will be efficient in oxidizing elemental mercury contained in flue gas. In one embodiment, the catalyst is gold, palladium, platinum, copper, aluminum, nickel, cobalt, titanium, activated alumina, rhenium, and combinations thereof. In other embodiments, the catalyst may be any element that is capable of oxidizing mercury.

The catalytic barrier filter does not require a secondary agent to adequately affix the catalyst to the filter. However, in other embodiments a secondary agent may be used to affix the catalyst to the barrier filter. Such agents include activated alumina, activated carbon, zeolytic materials, polymeric materials, clay, diatomaceous earth, and combinations thereof.

The amount of elemental mercury in flue gas that is oxidized is in a range of about 50 percent to about 99 percent of all the elemental mercury present in the gas.

In order to accurately clarify the invention, the following terms have the following associated meanings:

"Catalyst" means a substance that increases the rate of a chemical reaction in which the substance is not consumed by the reaction.

"Catalytic filter" means a filter that is impregnated with a catalyst. In the present invention the catalytic filter is used for the oxidation of element mercury.

"Chlorine" means any molecule or radical that contains at least one atom of chlorine.

"Elemental mercury" means the presence of molecules of mercury in which the charge balance of electrons and protons is equal.

"Barrier filter" means a barrier filter whereby solid particles are removed from the gas stream that passes through the pores in the solid support. Pore sizes range between about 0.3 microns to about 100 microns. For the purposes of this invention, a barrier filter may contain one, two, three, four or more individual barrier filters.

"Enclosed filter" means an enclosed device produced from filter material. The gas passes through the enclosed filter and out an opening of the enclosed filter. Enclosed filters include, but are not limited to, bag filter, baghouse filters and candle filters.

"Flue gas" means a vapor stream containing the products from a combustion process. Flue gas includes the gaseous species and any entrained liquid and/or solid particles within a gaseous stream.

"Oxidizing" means reacting elemental mercury with an oxidant to form a compound containing mercury in the +2 state.

"Oxidized mercury" means the presence of ions of mercury in which there are two additional protons compared to electrons in the atomic structure. These ions of mercury may be free ions in a gaseous or liquid solution or may be part of an ionic compound such as mercury oxide or mercury chloride.

The invention relates to a method and device for oxidizing elemental mercury within a flue gas stream using at least one barrier filter impregnated with a catalyst. The catalytic barrier filter is placed in line with a flue gas stream occurring from a combustion process using solid or liquid fuels containing elemental mercury. As the gas stream flows through the barrier filter, the elemental mercury contained within the gas is oxidized by the catalyst as it flows through the filter.

The process also facilitates the simultaneous removal of particulate matter, such as ash, present in the gas stream by the catalytic barrier filter. After passing through the catalytic barrier filter, the flue gas stream is then passed through other devices or processes employed to remove the now oxidized mercury.

FIG. 1, illustrates a catalytic barrier filter 10 housed in an enclosed filter unit 12. In other embodiments, catalytic barrier filter 10 is not enclosed. Flue gas produced by a coal process flows into inlet 14 and through catalytic barrier filter 10, or a plurality of catalytic barrier filters. Catalytic barrier filter 10 is impregnated with a catalyst which catalyzes the oxidation reaction between elemental mercury and the natural oxidants found in flue gas. In other embodiments, oxidants can be added to the flue gas before the gas encounters catalytic barrier filter 10. The flue gas then exits (outletting) enclosed filter unit 12 through outlet 16. Catalytic barrier filter 10 also removes particulate matter from the flue gas.

Impregnating the barrier filter with the mercury oxidizing catalyst is done through spray coating, wash-coating, sol-gel, and combinations thereof. In other embodiments, other application methods may be used to apply the catalyst to the filter.

The size and cost of the current design is about one-third to about one-quarter that of existing designs because the incoming mercury is first oxidized before removal by traditional processes.

Figure 2:
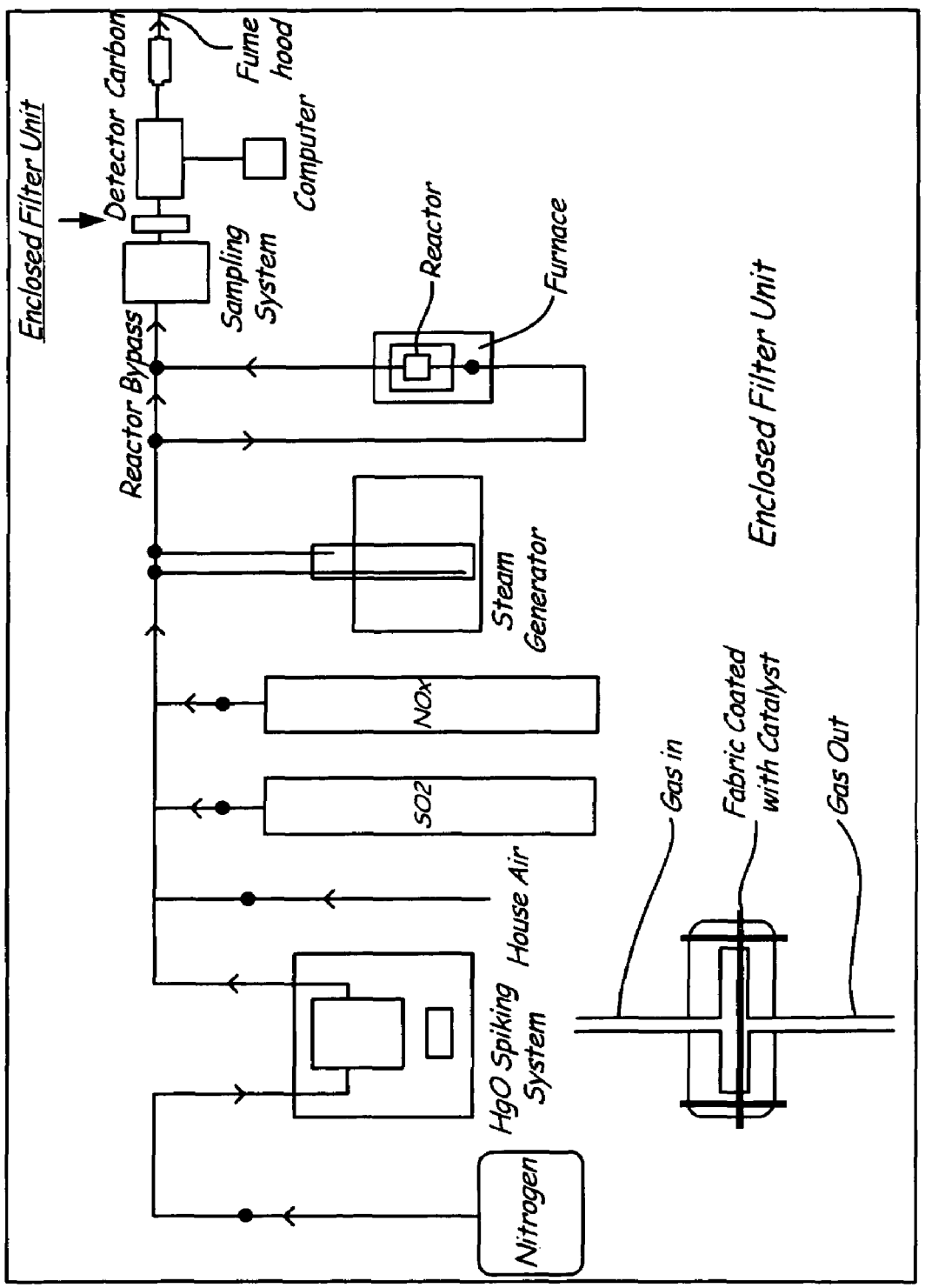
FIG. 2 is a flow diagram of a system housing an enclosed catalytic barrier filter designed to oxidize mercury within the flue gas stream.

The utility of the herein described invention is novel relative to existing technologies because of the ability to impregnate the filter material, to effectively oxidize elemental mercury, to simultaneous removal particulate matter from flue gas, and to be a cost effective solution for reducing mercury levels from flue gas of combustion processes. Specific examples of the invention are described herein. All laboratory experiments were performed using a simulated coal combustion flue gas stream containing mercury and oxygen and a fabric filter coated with catalyst, as shown in FIG. 2. FIG. 2 illustrates flow paths of the gas stream that were traveled before reaching the catalytic barrier filter.

EXAMPLE 1

Construction and Use of a Catalytic Barrier Filter

A fabric filter was coated with a catalyst, palladium, and was placed in the flow path of a coal combustion flue gas stream containing mercury. Many modern coal combustion plants use a baghouse containing multiple filter bags in order to remove fly ash particles from the flue gas prior to emission to the atmosphere. Many of these same coal combustion plants use a flue gas desulfurization system (FGD), such as a wet lime/limestone slurry, to remove $SO_2$ from the flue gas, after the baghouse prior to emission.

The fabric filter material chosen was described as follows: BHA PT001/P84 with Scrimm supported needle felt. Finish: heat stabilized, calendered, singed. Weight=441-526 $g/m^2$. Air Permeability: 25-45 $ft^3/min/ft^2$ (cfm) @ 0.5"H2O (ASTM D737). Min. Mullen Burst Strength=25 $kg/cm^2$. Min. Tensile Strength: warp direction=27 kg/cm; fill direction=40 kg/cm. Max. Temp.=260° C. Thermal Stability: 1.5% max @ 135° C. The catalyst chosen was described as follows: Palladium on alumina powder dry (5% Pd). Product of Acros Organics, MW=106.42, Particle diameter: 0.10 mm+/−0.01, Nitrogen flushed, Appearance: silver to grey or black powder, Assay other: 4.0 to 6.0% (Pd).

Flow rates during the experiments were adjusted to approximate a filtering velocity of 8 ft/min (acfm flue gas/$ft^2$ bag area) representing the high end (lowest residence time) for a full-scale baghouse. These results show that even with the short contact time afforded on the enclosed filter, over 85% oxidation of the elemental mercury was achieved for the felted fabric (PT001). It is evident from these results that very high levels of mercury oxidation can be achieved using this invention regardless of significant variations in temperature (Table 1).

TABLE 1

Mercury Conversion using Catalyst Coated Filter Bags

| Temperature ° C. | Mercury Oxidation (%) |
|---|---|
| 150 | 85 |
| 200 | 90 |
| 250 | 93 |

While this example is given using coal as the fuel for the combustion system, the example also holds true for combustion of other materials such as biomass and combustible wastes.

EXAMPLE 2

Construction and Use of Catalytic Barrier Filters for Small Baghouses for the Combustion of Gas or Oil A fabric filter spray-coated with gold (catalyst) was placed in the flow path of flue gas stream containing mercury and atmospheric oxygen, with relatively low particulate loading. Examples of this flow path include the gas stream produced from the combustion of gas or oil. For these applications, the particulate loading is low, and particulate removal may or may not be necessary to meet regulatory standards. For these applications, the impregnated catalyst enclosed filter was employed with a high air-to-cloth ratio without concerns of high pressure drop. This approach used a smaller baghouse with a lower number of bags relative to Example I.

Testing was performed using a simulated flue gas, where the simulated gas was free from particulate matter. The simulated flue gas contained $N_2$, $O_2$, $CO_2$, NO, $SO_2$ and $H_2O$. Varying quantities of Hg, $Cl_2$, and HCl were added to evaluate the effectiveness of the gold catalyst coated on a Teflon-coated quartz filter material to oxidize the elemental mercury to its oxidized form. Results indicated that in the $O_2$ containing stream, mercury oxidation efficiencies of approximately 60% were realized without the chlorine species present in the simulated flue gas stream. Higher oxidation efficiencies were noted when $Cl_2$ was added. The equivalent air-to-cloth ratio used for this testing was approximately 30 ft/min.

EXAMPLE 3

Construction and Use of Catalytic Barrier Filters for Small Baghouses for the Combustion of Coal, Biomass, or Waste Fuels This example includes the gas stream produced from the combustion of solid materials such as coal, biomass, or waste fuels, where these flue gases first passed through a primary filtration device, such as an electrostatic precipitator. In these particular cases, the particulate loading was low, similar to the levels seen in Example 2. Similar to Example 2, mercury oxidation was accomplished using the invention described at very high air-to-cloth ratios. The experiments performed with both the Pd (Example I) and the gold catalyst (Example II) provided data demonstrating the viability of the invention.

The description of the specific embodiments of the invention is presented for the purposed of illustration. It is not intended to be exhaustive nor to limit the scope of the invention to the specific forms described herein. Although the invention has been described with reference to several embodiments, it will be understood by one of ordinary skill in the art that various modifications can be made without departing from the spirit and the scope of the invention, as set forth in the claims.

The invention claimed is:

1. A method for removing elemental mercury present in flue gas using a catalytic barrier filter, the method comprising:
   directing the flue gas towards the catalytic barrier filter;
   passing the flue gas through the catalytic barrier filter in the presence of an oxidant, wherein about 50 percent to about 99 percent of the elemental mercury in the flue gas is oxidized;
   directing flue gas containing oxidized mercury away from the catalytic barrier filter; and
   removing the oxidized mercury from the flue gas downstream from the catalytic barrier filter.

2. The method of claim 1, wherein the catalytic barrier filter simultaneously removes particulate matter from the flue gas.

3. The method of claim 1, wherein the catalytic barrier filter is selected from a group consisting essentially of bag filters, baghouse filters, candle filters, polymeric filters, metallic filters, ceramic filters, natural fiber filters, and combinations thereof.

4. The method of claim 1, wherein the oxidant is added to the flue gas.

5. The method of claim 4, wherein the added oxidant is selected from a group consisting essentially of oxygen, chlorine, peroxides, HCl, hypochlorite, and combinations thereof.

6. The method of claim 1, wherein the flue gas is a result of a combustion process.

7. The method of claim 1, wherein a catalyst capable of oxidizing elemental mercury in the presence of the oxidant is impregnated onto the catalytic barrier filter.

8. The method of claim 7, wherein the catalyst is selected from a group consisting essentially of gold, palladium, platinum, copper, aluminum, nickel, cobalt, titanium, activated alumina, rhenium, and combinations thereof.

9. The method of claim 7, wherein a secondary agent is used to affix the catalyst to the catalytic barrier filter, wherein the secondary agent is selected from a group consisting essentially of activated alumina, activated carbon, zeolytic materials, polymeric materials, clay, diatomaceous earth, and combinations thereof.

10. The method of claim 1, wherein a plurality of catalytic barrier filters is used.

11. A method of removing elemental mercury from a flue gas stream, the method comprising:
    passing the flue gas stream through a catalytic barrier filter in the presence of an oxidant to oxidize about 50 percent to about 99 percent of the elemental mercury in the flue gas stream;
    directing the flue gas stream containing oxidized mercury away from the catalytic barrier filter; and
    removing the oxidized mercury from the flue gas stream downstream from the catalytic barrier filter.

12. The method of claim 11, wherein the catalytic barrier filter simultaneously removes particulate matter from the flue gas stream.

13. The method of claim 11, wherein the catalytic barrier filter is selected from a group consisting essentially of bag filters, baghouse filters, candle filters, polymeric filters, metallic filters, ceramic filters, natural fiber filters, and combinations thereof.

14. The method of claim 11, wherein the oxidant is added to the flue gas.

15. The method of claim 14, wherein the added oxidant is selected from a group consisting essentially of oxygen, chlorine, peroxides, HCl, hypochlorite, and combinations thereof.

16. The method of claim 11, wherein a catalyst capable of oxidizing elemental mercury in the presence of the oxidant is impregnated onto the catalytic barrier filter.

17. The method of claim 16, wherein the catalyst is selected from a group consisting essentially of gold, palladium, platinum, copper, aluminum, nickel, cobalt, titanium, activated alumina, rhenium, and combinations thereof.

18. The method of claim 11, wherein a plurality of catalytic barrier filters is used.

* * * * *

UNITED STATES PATENT AND TRADEMARK OFFICE
CERTIFICATE OF CORRECTION

PATENT NO. : 7,618,603 B2
APPLICATION NO. : 11/328726
DATED : November 17, 2009
INVENTOR(S) : Seames et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

PATENT NO.       : 7,618,603 B2                                    Page 1 of 1
APPLICATION NO.  : 11/328726
DATED            : November 17, 2009
INVENTOR(S)      : Wayne Seames et al.

It is certified that error appears in the above-identified patent and that said Letters Patent is hereby corrected as shown below:

In the Specification

Column 1, line 3 please add the following Statement of Government Interest:

STATEMENT OF GOVERNMENT INTEREST
This invention was made with government support under Grant No. DE-FG26-02NT14553 awarded by the United States Department of Energy. The government has certain rights in the invention.

Signed and Sealed this
Twenty-sixth Day of November, 2013

Margaret A. Focarino
*Commissioner for Patents of the United States Patent and Trademark Office*